United States Patent [19]
Klaiber et al.

[11] Patent Number: 5,288,523
[45] Date of Patent: Feb. 22, 1994

[54] CROSSLINKABLE RESIN COMPOSITION COMPRISING A THERMOPLASTIC RESIN

[75] Inventors: Adolf A. Klaiber, Neuss, Fed. Rep. of Germany; Johannes F. H. Courtier, Hoogstraten; Daniel Gaeckle, Waterloo, both of Belgium

[73] Assignee: Monsanto Company, St. Louis, Mo.

[21] Appl. No.: 74,622

[22] Filed: Jun. 11, 1993

Related U.S. Application Data

[62] Division of Ser. No. 899,567, Jun. 16, 1992.

[30] Foreign Application Priority Data

Jun. 20, 1991 [EP] European Pat. Off. ........ 91870099.8

[51] Int. Cl.$^5$ ............................. B05D 3/02; B05D 3/06
[52] U.S. Cl. ............................... 427/385.5; 427/388.1; 427/393.5; 427/393.6; 427/397; 525/281
[58] Field of Search ..................... 525/281; 427/385.5, 427/388.1, 393.5, 393.6, 397

[56] References Cited

U.S. PATENT DOCUMENTS

| | | |
|---|---|---|
| 2,552,600 | 5/1951 | Stubblebine . |
| 4,266,053 | 5/1981 | Imanaka et al. . |
| 4,520,184 | 5/1985 | Van Eenam . |
| 4,972,009 | 11/1990 | Suhadolink et al. . |
| 5,137,952 | 8/1992 | Miller et al. . |

FOREIGN PATENT DOCUMENTS

| | | |
|---|---|---|
| 977881 | 11/1975 | Canada . |
| 0210158 | 1/1987 | European Pat. Off. . |
| 3543266 | 6/1986 | Fed. Rep. of Germany . |

*Primary Examiner*—Vasu S. Jagannathan
*Attorney, Agent, or Firm*—Michael J. Murphy; Mark F. Wachter

[57] ABSTRACT

A crosslinkable resin composition containing:
(A) from 10% to 90% by weight of a thermoplastic resin component,
(B) from 90% to 10% by weight of a curable resin component, comprising, expressed by reference to the curable resin (100%),
  (i) 50% to 95% of a (meth)acryloyl derivative, and
  (ii) 50% to 5% of a (meth)allyloxy derivative, and
(C) from 0% to 30% by weight of a plasticiser for the thermoplastic resin component, is disclosed.

Also a new crosslinked resin layer and a process for the manufacture of the new crosslinked resin layer on a substrate are described.

The crosslinked resin layer herein exhibits a desirable balance between flexibility, resistance to stain and resistance to scuff properties, in combination with outstanding mechanical and chemical properties.

The crosslinkable resin composition is particularly suitable for coating application of various substrates such as flooring materials, wall covering materials, coils, wires, and various shaped articles e.g. cars, containers and metallic profiles.

11 Claims, No Drawings

CROSSLINKABLE RESIN COMPOSITION COMPRISING A THERMOPLASTIC RESIN

This is a division of application Ser. No. 07/899,567, filed Jun. 16, 1992.

This invention relates to compositions comprising a thermoplastic resin component and a crosslinkable resin component which compositions are suitable for the manufacture of crosslinked resin layers, to a process for the manufacture of the crosslinked resin layer on a substrate and to a crosslinked resin layer comprising a thermoplastic resin.

The coating of a substrate by a resin is a technique which has found widespread application in various technical fields and for various purposes. In view of their particularly desirable combination of physicochemical properties, mechanical properties, commercial availability, ease of processing and relatively low material costs, thermoplasts are a class of resins which is very useful for coating applications. Typical applications are for example in the field of floor coatings, wire and coil coatings, fabrics coatings and coatings of shaped articles. These coatings may serve various purposes such as, for example, covering of rough and/or unaesthetic surfaces; electrical-, acoustical- and/or thermal insulation; providing a liquid-, particularly a water-impenetrable layer; providing a protective layer against corrosion, and providing a protective layer against undesirable impact from weather conditions. In spite of their desirable properties, coatings from thermoplasts have also technical weaknesses such as lack of resistance to solvents, to stain, to scratches, to scuff and to heat.

Improved coatings have been developed in which the thermoplast is covered by a wear and/or top layer. Such technique is for example applied in current flooring material, in which a relatively thick (e.g. 2 to 3 mm) PVC foam layer is coated with a relatively thin (0.2 to 0.5 mm) wear layer of transparent PVC, and optionally with a supplementary top coating (e.g. 10 to 30 micrometer thick) of e.g. a polyurethane. Such flooring material presents good to excellent resistance to stain, to scratch and to scuff and is fairly resistant to heat, e.g. such material may be cigarette-proof.

These floorings are affected by weaknesses such as e.g.:
composing the multilayer product is technically complicated;
ensuring a permanent and perfect adhesion between the different layers is technically difficult;
during the process of applying the wear and/or top layer to an underlying core layer, the possible relief structure of the latter may be destroyed if the wear and top coating is applied by a calendering process;
the said wear and top layers are usually very thin and thus are easily worn out, which leads to the so-called "tunnelling effect+ and leaves the remaining underlaying core layer unprotected;
polyurethane top layers are expensive compared to transparent PVC wear layers, which can make their utilization economically less attractive.

An alternative type of coating has been developed to overcome the above disadvantages. DE 3543266 describes a process for manufacturing a crosslinked PVC wear layer according to which a liquid composition comprising PVC, a crosslinking agent, preferably a 3 to 5 functional acrylate, and a UV-initiator is applied to a substrate, first thermally gellified, and than photochemically cured to form a crosslinked wear layer with good thermal resistance. The liquid composition can be applied directly onto the surface to be coated or can be applied to a facing sheet on which it is thermally gellified and than in a later step is laminated to the surface to be coated, and subsequently crosslinked by photoinitiation.

HUT 34299 discloses sheet-shaped products which are obtained by spreading a composition comprising PVC and a reactive plasticiser on a support which is either the surface to be coated or which is a carrier sheet, and heating the composition so a to form gelled, crosslinked and optionally foamed products which are harder than those obtained by conventional processes.

A major disadvantage of the known crosslinked resin layers, is the fact that they present an unfavorable balance between highly desirable properties including flexibility, stain resistance and scuff resistance. The better the known resin layers are resistant to stain and/or to scuff, the lesser they are flexible, and vice versa. This feature reduces significantly the possible technical applications of such crosslinked resin layers in coatings. The lack of an optimal combination of the said properties is particularly undesirable for coated sheeted material such as flooring, coils, fabrics and textiles, because when the crosslinked coating layer is highly resistant to stain, it presents very poor flexibility and this shortcoming may lead to serious damage of the crosslinked resin layer when the sheeted material is in use or deformated, such as e.g. rolled up.

It is an object of this invention to provide a curable composition comprising a thermoplastic resin component and a curable resin component (i.e. a crosslinkable resin component) from which a crosslinked resin layer may be obtained which presents a desirable degree of flexibility in combination with a good resistance to stain and to scuff. It is another object of the invention to provide a crosslinked resin layer comprising a thermoplastic resin component which presents a desirable degree of flexibility in combination with a good resistance to stain and to scuff, and a process for making the same. A further object of the invention is to provide a curable composition comprising a thermoplastic resin component and a curable resin component which is suitable for the manufacture of a crosslinked wear layer for flooring presenting an optimised balance between flexibility, stain resistance and scuff resistance. Still a further object of the invention is to provide a crosslinked wear layer for flooring having a desirable degree of flexibility in combination with good stain and scuff resistance and a method for making said coating.

The inventors have observed that certain curable resins provide a technically desirable degree of flexibility to a crosslinked composition of said curable resin and a thermoplastic resin component, said flexibility being maintained when the composition is fully cured while at the same time achieving excellent physical and chemical resistance. This observation is the basis of the present invention.

The subject invention relates to a new curable resin composition comprising a thermoplastic resin component, a curable resin component, and optionally a plasticiser for the thermoplastic resin component.

The invention further relates to a process for providing a cured resin layer on a substrate which comprises applying a film of a composition according to the invention onto the substrate and subsequently curing the composition by a method known per se.

The invention also relates to a crosslinked resin layer, obtained by curing a composition of the invention, which presents a technically desirable combination of flexibility, stain resistance and scuff resistance.

A preferred embodiment of the invention relates to a curable resin composition comprising a thermoplastic resin component, a curable resin component and optionally a plasticiser for the thermoplastic resin component, which is suitable for the manufacture of a crosslinked resin wear layer for flooring material and wall covering applications which presents a highly desirable degree of flexibility, of stain resistance and of scuff resistance.

A further preferred embodiment of the invention relates to a composition which is suitable for the manufacture of a crosslinked resin coating on a wire, a coil, a fabric, and a shaped article, the cured resin comprising a thermoplastic resin component, a curable resin component, and optionally a plasticiser for said thermoplastic resin.

In still another preferred aspect the invention relates to a curable resin composition comprising a thermoplastic resin component, a curable resin component and optionally a plasticiser for said thermoplastic resin which is suitable for the manufacture of a crosslinked coating for metal surfaces, particularly for coil coating applications, e.g. for manufacturing of precoated metal sheets, and for underbody coatings of cars and other vehicles.

The new, crosslinkable resin composition according to the invention comprises:

(A) from 10% to 90% by weight of a thermoplastic resin component,
(B) from 90% to 10% by weight of a curable resin component, comprising, expressed by reference to the curable resin component (100%),
  (i) 50% to 95% of a (meth)acryloyl derivative, and
  (ii) 50% to 5% of a (meth)allyloxy derivative, and
(C) from 0% to 30% by weight of a plasticiser for the thermoplastic resin component.

In the compositions of the invention, the weight percentage of the thermoplastic resin component (A), the curable resin component (B) and the plasticiser (C) are expressed as the percent by weight of pure, plasticiser-free thermoplastic resin (A), respectively, pure curable resin (B), and pure plasticiser (C), with respect to the total weight of the components (A)+(B)+(C) in the crosslinkable composition.

The terms "curable resin", "curing" and "cured" used herein correspond to the terms "crosslinking agent or crosslinkable resin", to "crosslinking", and to "crosslinked " respectively, and they are used interchangeably.

Also the terms "thermoplastic resin", "thermoplastic polymer" and "thermoplast" are used interchangeably, and the term "polymer" includes homopolymers, all various kinds of copolymers, graft copolymers, and polymer blends.

By thermoplastic resin component is meant herein a thermoplastic polymer which may be a pure resin or resin mixture i.e. free of plasticiser, or which may contain plasticiser.

Typical thermoplastic resins suitable for compositions according to the invention comprise, for example, polyvinyl chloride (hereafter "PVC"), ABS-resin, polystyrene, a polyacetal, polyvinyl acetal, polyvinyl butyral (hereafter "PVB"), polyethylmethacrylate, polymethylmethacrylate, polyvinyl acetate, a polyester, a polyamide, a polyurethane, or a mixture thereof.

For use in the compositions of the invention, the thermoplastic resins may be free of plasticiser(s) or may contain up to 50% by weight plasticiser(s), expressed with respect to the plasticised thermoplastic resin. Preferably the thermoplastic resin contains between 5% and 30% by weight plasticiser. The said thermoplasts and plasticisers are derivatives which are well known in the art and which are commercially available from various sources. It is obvious that specific thermoplastic resins may require specific plasticisers, but this is well known to the skilled person and sufficient information is publicly available to enable the skilled person to make a proper choice as to kind of plasticiser.

A preferred thermoplast is PVC resin in the form of PVC plastisol or PVC paste; PVC plastisol being a liquid dispersion of PVC resin in a suitable plasticiser.

PVC suitable for the compositions of the invention may, for example, be manufactured by emulsion polymerization, microsuspension polymerization, suspension polymerization or can be PVC extender resin.

The PVC plastisol and PVC paste may comprise, expressed in parts per hundred parts PVC resin (phr), up to about 100 phr plasticiser, preferably from 20 to 100 phr, more preferably from 20 to 60 phr.

Preferably the PVC plastisol and PVC paste comprises also a heat stabiliser or a combination of heat stabilizers. The heat stabilisers are commercial products, well known in the art, and are present in the PVC plastisol or PVC paste at a level up to 20 phr, preferably from 0.1 to 10 phr. A particularly effective heat stabiliser for PVC is, for example, epoxidised soya bean oil. It is normally used at the concentration from 0.1 to 5 phr, and in many cases very good heat stabilisation is already obtained with an amount from 0.1 to 3 phr.

In another preferred embodiment the thermoplastic resin component is polyvinyl butyral ("PVB"). The PVB resin may be nonplasticised resin or plasticised resin containing up to about 100 phr plasticiser. Typical plasticisers for PVB resin are, for example, di-n-hexyl adipate, butyl benzyl phthalate, 3-ethyleneglycol ethyl butyrate, dioctyladipate, and tetraethyleneglycol heptanoate.

The essential curable resin component in the compositions of the invention comprises a (meth)acryloyl derivative or a mixture of (meth)acryloyl derivatives preferably selected from the group represented by the formula (I)

$$(CH_2=C(R_1)CO)_aW \qquad (I)$$

wherein $R_1$ is H or a $CH_3$ group, wherein a is, in compliance with the functionality of W, an integer in the range of 1 to 10, and W is OH, $NH_2$, or a saturated or ethylenically unsaturated residue of an alcohol, a polyol, a mono- or poly(carboxylic acid), a mono- or polyamine, an amide or polyamide, a mono- or polyepoxide, an isocyanate, a polyisocyanate or a methylol amino resin, such residue being of number average molecular weight less than about 4000 daltons and containing a hydrocarbon, ester, amide, ether, urethane or amino resin nucleus or backbone. Another preferred (meth)acryloyl derivative for use in a composition according to the invention is a derivative which is selected from the group represented by the formulae (II), (III), and (IV):

$$X(R)_b \qquad (II)$$

wherein X represents a nucleus

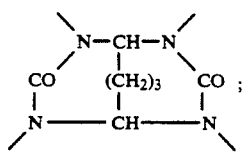

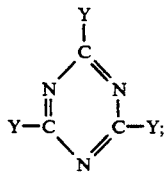 (III)

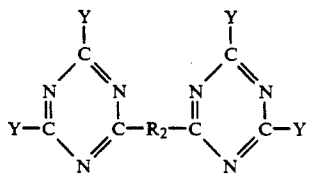 (IV)

wherein R is independently selected from the group consisting of:
A. $(CH_2O)_m R_3$
B. $CH_2N(R_4)COC(R_5)=CH_2$
C. $CH_2(OR_6)_n OCOC(R_5)=CH_2$, and
D. $(CH_2O)_p CH_2 R_6$ wherein the Y groups are individually selected from H or a $C_1$ to $C_{10}$ linear or branched or cyclic saturated or unsaturated aliphatic or aromatic monovalent hydrocarbyl radical or

R being defined above, and no more than one Y group per triazine ring is H or a $C_1$ to $C_{10}$ hydrocarbyl radical; wherein $R_2$ is represented by the formula

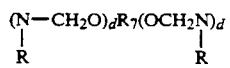

in which the two d subscripts are either both 0 or 1; and R being defined above;

wherein $R_7$ is a $C_2$ to $C_{10}$ saturated or unsaturated aliphatic hydrocarbyl radical;

wherein $R_3$ is H, or a $C_1$ to $C_{10}$, linear or branched or cyclic, saturated or unsaturated aliphatic or aromatic monovalent hydrocarbyl radical but not more than one $R_3$ per X nucleus is H;

wherein $R_4$ and $R_5$ are individually selected from hydrogen and methyl;

wherein $R_6$ is $[X(R)_{b-2}-(CH_2O)_r-CH_2]_s-X(R)_{b-1}$ wherein b is the valence of the X nucleus, and which is in the range of 4 to 10;

wherein c,m,n,p and r are individually in the range of 0 to 1;

wherein the average s is in the range of 0 to 2;

wherein the average number of A groups per X nucleus is in the range of 1 to (b−0.8), the average number of B+C unsaturated groups per X nucleus is in the range of 0.8 to (b−1) and wherein the average number of X nuclei per molecule is in the range of about 1 to about 3 and the average number of B+C unsaturated groups per molecule is in the range of about 1.2 to about 10.

An even more preferred (meth)acryloyl derivative for use in a crosslinkable composition of the invention is an acrylamido methylmelamine derivative of formula (V) or (VI)

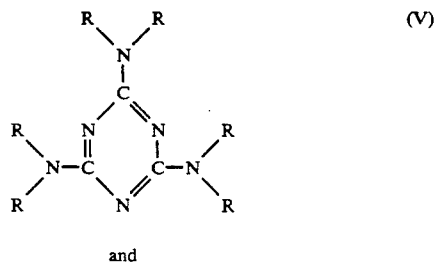 (V)

and

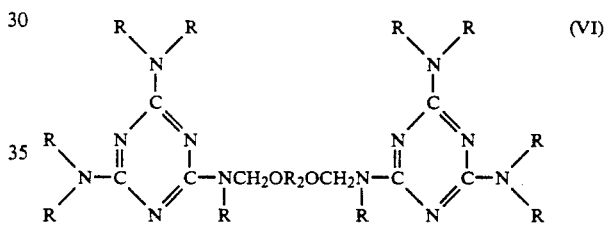 (VI)

wherein R has the meanings, defined hereinbefore, the A group being a H or $CH_2OR_3$, $R_3$ being defined above; the B group representing the group $CH_2NHCOCH=CH_2$ and being present in the range of 0.8 to 2.5 per melamine nucleus; and wherein the C group is absent.

Still another more preferred (meth)acryloyl derivative is an acrylamidomethylmelamine derivative of formula (V

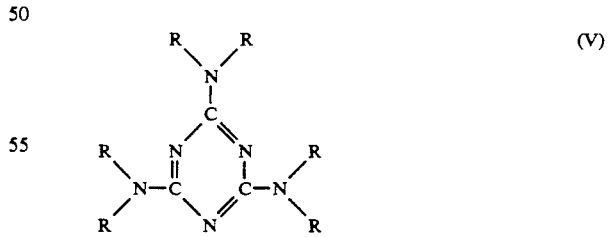 (V)

wherein R has the meanings defined above, and the A group is H or $CH_2OR_3$, $R_3$ being defined above; the B group represents the group $CH_2NHCOCH=CH_2$ and is present in the range of 0.8 to 2.5 per melamine nucleus; and wherein the C group is absent.

Examples of the said acrylamidomethylmelamine (hereafter "AM") derivatives are the derivatives corresponding to formulae (VII) and (VIII)

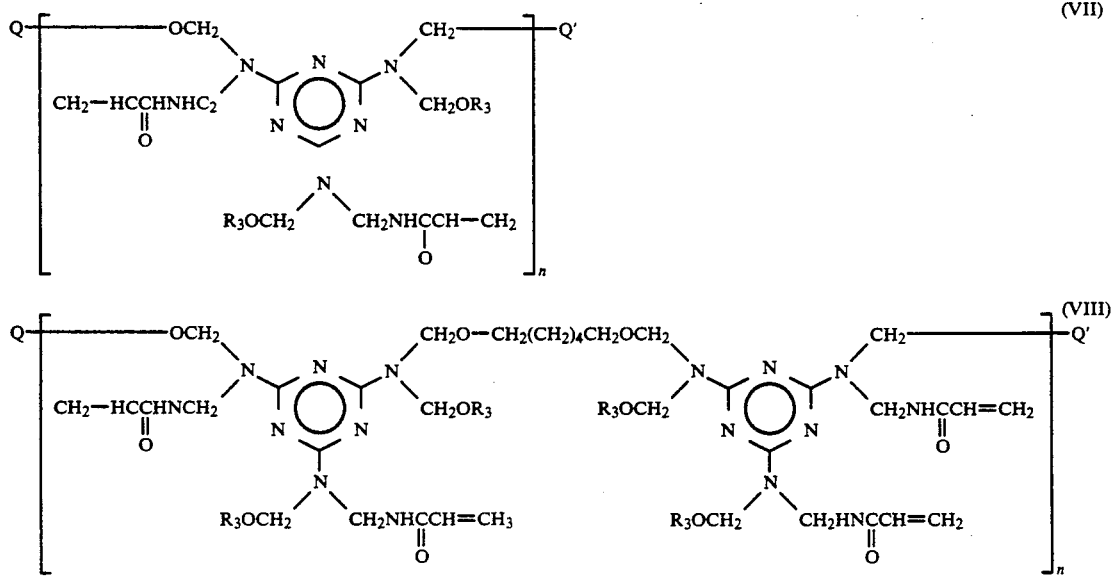

wherein Q' is an end group, e.g. a hydrogen or a (CH$_2$O)$_m$ R$_3$ group defined above, wherein Q is an end group, e.g. an hydroxyl group, an acrylamido group or an R$_3$ group; and wherein R$_3$ has the meanings defined hereinbefore.

These AM derivatives are commonly used as a solution. Said solution may contain up to 75% weight, preferably about 65% weight of the AM derivative dissolved in a multifunctional acrylate, or acrylate mixture, or in a solvent, or solvent mixture, or in a plasticiser or plasticiser mixture. Preferably the AM derivatives are used as a solution containing the AM derivative dissolved in a plasticiser. Typical multifunctional acrylates are for example trimethylolpropane triacrylate (TMPTA) and tripropyleneglycol diacrylate (TPGDA).

Suitable plasticisers are for example dialkyl phthalates, benzyl phthalates, phosphate esters, adipic esters, and various other plasticisers known in the art.

The said (meth)acryloyl derivatives of formulae I to VIII are known compounds, e.g. dislcosed in U.S. Pat. No. 4,281,091; U.S. Pat. No. 4,293,461; U.S. Pat. No. 4,517,327; U.S. Pat. No. 4,554,319; U.S. Pat. No. 4,634,738; U.S. Pat. No. 4,808,652; and U.S. Pat. No. 4,582,894; and/or are commercially available, e.g. as Santolink® AM products from Monsanto. (Santolink® is a Tradename of Monsanto Company).

The (meth)allyloxy derivative comprised in the curable resin component is preferably selected from the group represented by the formulae:

| | |
|---|---|
| R$_8$((E)$_u$R$_9$)$_v$; | (IX) |
| R$_{11}$(OCH$_2$R$_{12}$)$_x$; | (X) |
| R$_{13}$(CH(OCH$_2$R$_{12}$)$_2$)$_y$ | (XI) |
| and | |
| R$_{14}$(OCH$_2$R$_{12}$)$_z$ | (XII) | wherein R$_8$ is a radical of molecular weight less than about 15,000 daltons obtained by removal of active hydrogen from an active hydrogen containing compound selected from the group consisting of water, alcohols, thiols, carboxylic acids, carboxylic amides and amines, where the functionality of R$_8$ is v and is in the range of 1 to 10, wherein E is a divalent radical selected from the group represented by the formulae

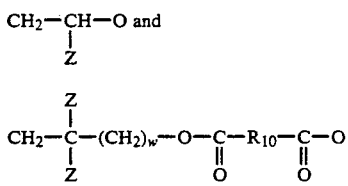

wherein Z is selected from the group consisting of H, CH$_3$, C$_2$H$_5$ and CH$_2$OCH$_2$R$_{12}$, R$_{12}$ being selected from the group consisting of

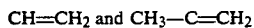

where w is 0 or 1, where R$_9$ is hydrogen or an unsubstituted or substituted C$_1$ to C$_{10}$ hydrocarbyl radical, where R$_{10}$ is a divalent unsubstituted or substituted C$_2$ to C$_{10}$ hydrocarbyl radical and where the product of u and v is at least 2 and not more than 60; where R$_{11}$ is a C$_2$ to C$_{12}$ aliphatic hydrocarbyl or oxahydrocarbyl radical of valence x in the range of 2 to 12; where R$_{13}$ is absent or is a C$_1$ to C$_{20}$ unsubstituted or substituted hydrocarbyl group and y is in the range of 2 to about 30; where R$_{14}$ is a radical of molecular weight less than about 10,000 daltons obtained by removal of 2z active hydrogens from a polyol and z is in the range of about 2 to about 60; and where the (meth)allyloxy derivative contains from 2 to 60 (meth)allyloxy groups per molecule.

In a preferred embodiment of the invention the (meth)allyloxy derivative is selected from the group represented by the formula:

where R$_8$ is a radical of molecular weight less than about 200 daltons obtained by removal of active hydrogen from an active hydrogen containing compound selected from the group consisting of water and saturated and unsaturated alcohols, where the functionality of $R_8$ is v and is in the range of 1 to 6, where E is a divalent radical represented by the formula

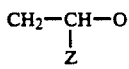

where Z is selected from the group consisting of $CH_3$ and $CH_2OCH_2CH=CH_2$ or $CH_2OCH_2-C(CH_3)=CH_2$, where $R_9$ is H, where the product of u and v is in the range of 4 to 40 and where the (meth)allyloxy derivative contains from 4 to 40 allyloxy groups per molecule.

These (meth)allyloxy compounds are known to the skilled man. They are commercially available and/or disclosed, for example, in U.S. Pat. No. 4,145,248, U.S. Pat. No. 4,308,187, U.S. Pat. No. 4,333,971 and U.S. Pat. No. 4,520,184. Several of the (meth)allyloxy compounds are commercially available as Santolink ® crosslinker initiator from Monsanto Company (Santolink ® is a trademark of Monsanto Company).

A particularly preferred (meth)allyloxy derivative is the derivative of formula

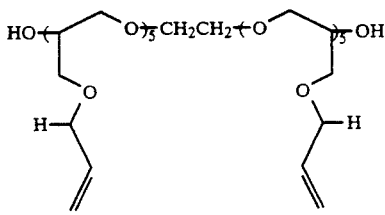

which is commercially available from Monsanto Company is Santolink ® XI-100.

Many of the said (meth)allyloxy derivatives, in particular Santolink XI-100, are uniquely activated polyunsaturated aliphatic liquid oligomers which may function both as an initiator of free radical polymerisation and as a multifunctional crosslinker by virtue of its multiple unsaturation. In the absence of oxygen, the (meth)allyloxy derivatives have excellent shelf stability. When exposed to ambient air, the (meth)allyloxy derivatives generate highly reactive free radicals which are particularly effective in initiating free radical polymerisation of (meth)acrylic unsaturated oligomers, unsaturated polyesters and alkyd resins.

The crosslinked resin layer according to the invention is provided by applying a film of the composition of the invention on the surface of the substrate to be coated. This may be done by conventional techniques. During this process step care has to be taken that the liquid or pasty composition is homogeneously spread on the surface, preferably without remaining air or gas bubbles. During the subsequent curing step reactive atoms or groups of the thermoplastic resin and/or the substrate may react with the curable resin so as to form a chemical bond and network which ensures excellent adhesion between the crosslinked resin layer and the substrate.

The crosslinkable composition can be cured by conventional techniques well known in the art, such as e.g. thermally; by irradiation with UV-light; by treatment with microwaves; by irradiation with high-energy beams; and by combination of known techniques, such as e.g. thermally and irradiation with UV light, either both applied simultaneously or subsequently in any order.

The compositions and the process according to the invention may be used for coating substrates by a batch process, as well as via a continuous process.

Various materials may be used as substrate, such as for example shaped articles, e.g. articles in wood, in plastic, in concrete and conglomerate, metallic shaped articles, e.g. cans, cars, ships, wires, coils, metal plates, and metallic profiles; fabrics and sheets of non-woven material, such as e.g. glassfiber mats; sheets of polymeric material, textiles, flooring, wall covering; plastic foamed material, optionally bound to an underlaying facing material, such as a flexible foam material, e.g. PVC foam, embossed or non-embossed cushioned vinyl flooring; or a rigid foam material, such as e.g. polyurethane, polyisocanate or phenolic foam.

In view of the desired application the crosslinkable resin composition can comprise further components, all well known in the art, such as e.g. plasticisers, colouring agents, fillers, UV-stabilisers, heat-stabilisers, flame retardants, antioxydants, wetting agents and diluents. Preferably said diluents are capable to react with the curable resin during the curing step, such as, for example, (meth)acrylates, urethane-(meth)acylates, epoxy(meth)acrylates, and unsaturated polyester derivatives.

To initiate and/or facilitate the curing reaction, the curable resin composition preferably further comprises a metal salt catalyst or a free radical initiator system, which both are well known in the art.

If the crosslinking is thermally initiated, then preferably a metal salt catalyst is used, e.g. a cobalt octoate or manganese octoate or a mixture thereof. If the crosslinking is initiated by UV light, then conventional photoinitiator systems are used, preferably in combination with a said metal salt catalyst.

Advantageously, particularly in the case of thermally curing and/or UV curing, the crosslinkable composition further comprises a free radical initiator system such as e.g. a peroxide or hydroperoxide in combination with a said metal salt catalyst. The (hydro)peroxide can be used in a concentration ranging from 0.005% to 10% by weight, expressed with respect to the curable resin component, typically at a concentration ranging from 0.05% to 3% by weight, preferably at 0.1% to 1.5%. In combination with metal salt catalysts, the (hydro)peroxides form very effective free radical initiator systems, which are well known to the skilled person. A further advantage of the use of (hydro) peroxides in initiator systems is that the curing rate is significantly increased which makes the method very suitable for a continuous coating-curing process.

Another further advantage of the use of (hydro)-peroxides in initiator systems is that the formation of crosslinked resin layer surfaces which remain tacky for a certain time after curing, is avoided.

Typical examples of suitable (hydro)peroxides are, e.g. cumene hydroperoxide, dicumyl peroxide, benzoyl peroxide, 2,5-dimethyl-2,5-dihydro peroxy hexane.

The continuous process for manufacturing crosslinked resin layers is particularly useful for the coating of sheeted material such as, for example, fabrics, flooring material, wall covering material, canvass and glass fiber mats. A typical continuous process for the coating of flooring material or wall covering material comprises e.g. moving the substrate on a conveyor, applying the coating composition, adjusting the thickness of the composition, e.g. by passing the substrate with the coating composition between a slit or a nip between two rotating rolls, the width of which may be adaptable, then passing the construct through a curing section which can be, depending on the way the crosslinking reaction is initiated, (i) an oven, the temperature of which will be function of the coating composition, the chemical structure of the curable resin component, the catalyst and the initiator system. The temperature in the oven may optionally present a temperature gradient.

(ii) a zone in which the composition is irradiated with UV light, with high-energy beams, or with microwaves.

(iii) or a combination of both curing systems (i) and (ii).

An advantage of the compositions of the invention is that they enable the manufacture of relatively thick crosslinked resin layers, e.g. up to 1000 microns.

The thickness of the coating may vary according to the application: for flooring the thickness of the coating typically varies between 20 and 500 microns, preferably between about 50 and 150 microns.

The selection of a suitable catalyst and/or initiator system can be made by the skilled person based on routine experiments. The curing temperature may furthermore be selected so as to obtain fusion of the thermoplastic resin component, plastisol or paste in the crosslinkable resin composition during the curing step.

In the case of the thermally curing of a PVC thermoplast comprising composition, the selection is made such that the curing temperature is typically within the range of about 160° C. to 220° C. and the curing time typically within the range of about 1 to 4 minutes. Preferred curing conditions comprise, for example, a curing time from about 1.5 to 2.5 minutes at a temperature from about 180° C. to 200° C.

The curable composition and process of the invention is also very suitable for the manufacture of reinforced crosslinked resin layers, either via a batchwise process or via a continuous process. The latter is particularly suitable for the manufacture of a crosslinked resin layer which is reinforced by textile, resin fibers, canvas, various types of glassfiber mats, and wire netting. The technique is well known in the art. In a typical execution form the composition is spread on an underlaying facing sheet which is moved forwards via a conveyor, the reinforcement material is brought on top of the curable composition and covered with a further amount of curable composition and optionally with an upper facing sheet. The obtained sandwich structure can be passed through a nip between two rotating rolls which ensures intimate contact between the facing sheets, the curable composition and the reinforcement material, and which further enables to adjust the thickness of the sandwich structure.

Subsequently the sandwich structure is cured by conveying it through an oven, or by passing it in a zone where curing is ensured by appropriate irradiation.

The facing sheet is preferably constructed from a non-penetrable or limitedly-penetrable (so as to avoid excessive bleeding of the composition through the facing sheet) material, such as, for example, a metal sheet, preferably an aluminum metal sheet, a paper sheet, a craft paper sheet, a glass fiber mat, a polymeric material, e.g. polyethylene or a PVC sheet, a plastic foam layer, and the like. A typical procedure for such technique is for example disclosed in EP 0 118 013, U.S. Pat. No. 4,438,166 and U.S. Pat. No. 4,284,683.

The crosslinkable composition according to the invention is technically very interesting because it provides a means for coating substrates in an easy manner, even by a relatively thick crosslinked resin layer. Thermal initiation and thermally curing of the composition optionally in combination with UV curing, is a technically particularly useful process because it has the advantage over UV-light initiation and curing in that heating a film of a coating-composition is technically easy and well controllable. Crosslinking by UV light alone on the other hand, is technically more difficult to handle and to control, and may give rise to difficulties if the coating composition is relatively thick and/or contains colouring agents, UV-stabilisers or fillers.

The composition of the crosslinked resin composition is commonly adapted to the technical requirements of the desired crosslinked resin layer of coating and it can be determined by the skilled person by routine experiments.

The curable resin component broadly represents from 90% to 10%, preferably from 70% to 20% and usually from 60% to 30% by weight of the crosslinkable resin composition.

The curable resin component, contains expressed by reference to the curable resin (100)%, from 50% to 95%, preferably from 70% to 90% of the (meth)acryloyl derivative and from 5% to 50%, preferably from 30% to 10% of the (meth)allyloxy derivative.

A particular advantage of a crosslinked resin layer according to the invention over a coating of the prior art resides in the fact that the fully cured resin layer of the invention presents a technically desirable degree of flexibility in combination with desirable mechanical and physico-chemical properties even when the cured resin layer is relatively thick. This characteristic makes such crosslinked resin layer technically very useful and enables its use in a wide range of applications, such as e.g. for flooring material, wall covering material, typically for PVC flooring material and PVC wall covering material, canvass coating, coating of vehicles, car coating, in particular anti-chip coating and underbody coatings, wire coatings, coil coatings, ship coating, external and internal coatings for containers, e.g. cans and drums, coatings for parquet flooring, anticorrosion coating for various metallic shaped articles, protective coatings for wooden, metallic and plastic shaped articles, and the like.

Furthermore flooring with a coating according to the invention combines a particularly desirable degree of flexibility with excellent scuff resistance, stain resistance and resistance to tunnelling (i.e. wearing out of the wear layer at those surfaces or parts thereof which are subject to intense wearing).

The invention is illustrated by the examples given hereafter.

EXAMPLE 1

Crosslinkable resin composition

A crosslinkable resin composition is prepared by mixing under vacuum for 30 minutes the following ingredients, the amounts of which are indicated in parts per hundred parts thermoplastic resin (PVC resin).

| | |
|---|---|
| PVC emulsion resin | 100 |
| modified acrylated melamine | 60 |

-continued

| | |
|---|---|
| (AM ®-129) (1) | |
| urethane (meth)acrylate | 20 |
| (Ebecryl ®-284) (2) | |
| allyloxy derivative | 20 |
| (Santolink ® XI - 100) (1) | |
| plasticiser | 50 |
| (Santiciser ®-160) (1) | |
| metal salt catalyst (manganese salt) | 0.2 |
| dicumyl peroxide | 1.0 | son with control samples. The results are summarised in Table 1 (Cont'd).

The control sample shows that the crosslink density is not developed with PVC plastisol alone when it is subjected to the same curing conditions as the compositions of the invention.

Comparative Example 6 shows that the presence of a (meth)allyloxy derivatives is essential to obtain good surface cure and resistance to stain.

TABLE 1

COMPOSITIONS AND COATING PROPERTIES

| Example Number | Control sample | 3 | 4 | 5 | 6 comparative | 7 | 8 |
|---|---|---|---|---|---|---|---|
| modified acrylated melamine (AM ® derivative) (1) | | | | | | | |
| AM-1129 | | 12.00 | — | — | 16.00 | 16.00 | — |
| AM-1129N | | — | 12.00 | — | — | — | — |
| AM-1129N/2 | | — | — | 12.00 | — | — | — |
| AM-1160 | | — | — | — | — | — | 16.00 |
| urethane (meth)acrylate Ebecryl ® 284 (2) | | 4.00 | 4.00 | 4.00 | 4.00 | — | 4.00 |
| (meth)allyloxy derivative Santolink ® XI-100 (1) | | 4.00 | 4.00 | 4.00 | — | 4.00 | 4.00 |
| metal salt catalyst Manganese salt (2% solution) | | 0.50 | 0.50 | 0.50 | 0.50 | 0.50 | 0.50 |
| dicumyl peroxide | | 0.10 | 0.10 | 0.10 | 0.10 | 0.10 | 0.10 |
| PVC plastisol (a) | 50.00 | 30.00 | 30.00 | 30.00 | 30.00 | 30.00 | — |
| Heat stabiliser Irgastab ® TK-262 (3) | 0.03 | 0.03 | 0.03 | 0.03 | 0.03 | 0.03 | 0.03 |
| PVC resin Lucovyl ® PB-1302 (4) | — | — | — | — | — | — | 20.10 |
| Plasticiser Santiciser ® S-1706 (1) | — | — | — | — | — | — | 4.30 |
| Surface Cure | 2 | 3 | 3 | 3 | 2 | 4 | 4 |
| Initial Mix Color (Hunter delta b) | N/D | 5.30 | 4.83 | 5.40 | 6.83 | 5.54 | 6.53 |
| Aged Mix Color (Hunter delta b) | 6.50 | 6.59 | 6.22 | 6.16 | 7.06 | 6.02 | 6.01 |
| Yellow Dye (30') | 10 | 3 | 5 | 4 | 8 | 7 | 3 |
| Erichsen Flexibility | >200 | 190 | >200 | >200 | >200 | 130 | 170 |
| E' Min (×10 E-8 dynes/sq cm) | 0.156 | 2.8 | 1.8 | 1.3 | 1.0 | 4.7 | 2.7 |
| Tan Delta (Max.) | 0.802 | 0.45 | 0.46 | 0.51 | 0.54 | 0.35 | 0.43 |
| Tg (Degrees C.) | 27.6 | 39 | 42 | 42 | 44 | 38 | 40 |
| Gauge (Microns) | 81 | 65 | 67 | 66 | 67 | 68 | 67 |

Legend
(a): composition: PVC resin (Lucovyl ® PB-1302 (4): 100 parts, and Plasticiser (Santiciser ® S-1706) (1): 50 parts.
®: Trademark of: (1) Monsanto Company; (2) UCB; (3) Ciba Geigy; (4) Atochem
surface cure (by physical observation):
1 = Tacky
2 = Poor slip
3 = Good slip
4 = Excellent slip
Yellow dye test (at 30 minutes): 0 = best; 10 = worst.

(1) : Tradename of Monsanto Company
(2) : Tradename of UCB company (Belgium)

EXAMPLE 2

The composition of Example 1 is applied onto a PVC sheet flooring article in a layer with a thickness of 100 micron and cured for 2 minutes at 190° C. which provides the PVC sheet flooring article with a crosslinked resin coating. Compared to PVC flooring with a conventional wear layer, the crosslinked coating presents good flexibility, very good resistance to stain, and excellent scuff resistance.

EXAMPLE 3 TO 8

The compositions are prepared as described in Example 1 and summarised in Table 1 hereafter. The amount of ingredients is indicated in gram.

These compositions are used to coat a PVC sheet flooring material with a resin layer of a thickness of 100 microns, as described in Example 2.

The properties of the cured resin layer are examined by conventional techniques and are shown in comparison with control samples.

We claim:

1. A process for making a cured resin coating on a substrate which comprises applying on a substrate a film of a curable composition comprising:
   (A) 10% to 90% by weight of a thermoplastic resin component,
   (B) 90% to 10% by weight of a curable resin component, comprising, expressed by reference to the curable resin component (100%),
      (i) 50% to 95% of a (meth)acryloyl derivative, and
      (ii) 50% to 5% of a (meth)allyloxy derivative, and
   (C) 0% to 30% by weight of a plasticiser for the thermoplastic resin component, and subsequently curing the composition.

2. The process of claim 1 wherein the composition is thermally cured or UV-light cured or cured by a combination of thermal and UV-light curing.

3. The process according to claim 2 wherein the composition is cured at a temperature which allows the thermoplastic resin component to fuse.

4. The process as in any of claims 1, 2 or 3 wherein the substrate is a metallic, wooden, plastic, concrete or conglomerate shaped article.

5. The process of claim 4 wherein the substrate is a flooring material or wall covering material.

6. The process of claim 5 wherein the substrate is a PVC flooring material, a PVC wall covering material, or an embossed or non-embossed cushioned vinyl flooring material.

7. The process of claim 4 wherein the metallic shaped article is a car or another vehicle, a ship, a metal profile, a wire, a coil or a container.

8. The process of claim 1 wherein the substrate is a fabric, a resin fibre, a canvas, or a glass fiber mat.

9. The process of claim 1 wherein the support is a plastic foamed material.

10. The process of claim 1 wherein the cured resin coating has a thickness between 20 and 500 microns.

11. The process of claim 1 wherein the crosslinked resin layer further comprises a reinforcement material and optionally an under or upper facing sheet.

* * * * *